United States Patent Office 3,732,236
Patented May 8, 1973

1

3,732,236
2-PHENYL-INDOLINE AMIDINES
Yao Hua Wu and Walter G. Lobeck, Jr., Evansville, Ind., assignors to Mead Johnson & Company, Evansville, Ind.
No Drawing. Filed Apr. 12, 1971, Ser. No. 133,365
Int. Cl. C07d 27/38
U.S. Cl. 260—296 B                 14 Claims

ABSTRACT OF THE DISCLOSURE

Indoline amidines which have a 2-phenyl substituent are effective diuretic and analeptic agents. They are prepared by reacting a 2-phenylindoline with a carboxamide selected from the group consisting of formamides and lactams in the presence of phosphorus oxychloride. Typical examples of the 2-phenylindoline amidines are 2-phenyl-1-[7 - (3,4,5,6-tetrahydro 2H-azepinyl)]indoline and 1-(tert.-butyliminomethyl)-2-phenylindoline.

BACKGROUND OF THE INVENTION

This invention pertains to carbon compounds which have drug and bio-affecting properties and to body treating compositions thereof. In particular, this invention relates to carbocyclic or acyclic amidines which are effective as analeptic and diuretic agents. Other features of the invention are a therapeutic process for producing diuretic and analeptic effects in mammals by administration of the amidines and pharmaceutical compositions containing same.

Certain indoline amidines are stated to be of interest as analeptics and analgesics according to Y. Wu and W. G. Lobeck, Jr., J. Med. Chem., 13, 975 (1970) and their copending application U.S. Ser. No. 862,915, now U.S. Pat. No. 3,679,692.

It has now been found, surprisingly, that 2-phenylindoline amidines and their salts have diuretic action and analeptic activity.

SUMMARY OF THE INVENTION

This invention relates generally to 2-phenylindoline derivatives and more particularly to 2-phenylindoline amidines of Formula I and non-toxic pharmaceutically acceptable acid addition salts thereof.

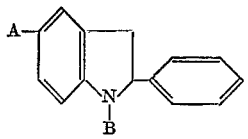

2

Formula I

The substances represented by Formula I are novel compositions of matter and are useful as diuretic and analeptic agents in mammals.

In Formula I, A signifies a substitutent which includes hydrogen, lower alkyl, lower alkoxy, and halogen including chlorine, bromine, fluorine, and iodine. B is a substituent selected from the group consisting of an imino moiety represented by —CH=N—$R^1$ and

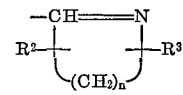

wherein $n$ is an integer of 3 to 5, $R^1$ is lower alkyl, and $R^2$ and $R^3$ are independently selected from the group consisting of hydrogen and lower alkyl. Among the suitable B substituents are:

1-pyrrolin-2-yl;
5-methtyl-1-pyrrolin-2-yl;
5,5-dimethyl-1-pyrrolin-2-yl;
4-methyl-1-pyrrolin-2-yl;
3-methyl-1-pyrrolin-2-yl;
3,4,5,6-tetrahydro-2H-azepin-7-yl;
3,4,5,6-tetrahydropyrid-2-yl;
N-methyliminomethyl;
N-ethyliminomethyl;
N-n-propyliminomethyl;
N-isopropyliminomethyl;
N-n-butyliminomethyl;
N-sec.-butyliminomethyl;
N-tert.-butyliminomethyl.

It is to be understood that by the terms "lower alkyl" and "lower alkoxy" as used hereinabove, it is meant that the carbon chains which comprise these groups include both straight and branched chain carbon radicals of 1 to 4 carbon atoms inclusive. Exemplary of these carbon chain radicals are methyl, ethyl, propyl, isopropyl, 1-butyl, 1-methylpropyl, 2-methylpropyl, and tert.-butyl.

By the term "independently selected" as used herein it is meant that the $R^3$ and $R^2$ substituents may or may not be identical.

The compounds of Formula I are basic and generally crystalline compounds which are practically insoluble in water, but fairly or readily soluble in most organic solvents and in aqueous solutions or organic or inorganic acids. Conversion of the 2-phenylindoline amidine bases of Formula I to corresponding non-toxic pharmacetically acceptable acid addition salts is accomplished by admixture of the base with a selected acid in an inert organic solvent such as ethanol, benzene, ethyl acetate, ether, halogenated hydrocarbons and the like. It is to be understood that, as used herein, the term "non-toxic pharmaceutically acceptable acid addition salts" refers to a combination of the compounds of Formula I with relatively non-toxic inorganic or organic acids.

One preferred method of salt preparation is to treat the base with substantially one chemical equivalent of ethanolic hydrogen chloride in ethanol solution. The 2-phenylindoline amidines salt precipitates from the ethanolic solution upon chilling or the addition of anhydrous ether. Both the free base and salt forms of products of Formula I are useful for the purposes of the invention although salts are particularly preferred because of their general water solubility.

Some examples of non-toxic pharmaceutically acceptable acid addition salts of 2-phenylindoline amidines of Formula I are the salts of a vareity of inorganic or organic acids such as sulfuric, phosphoric, hydrochloric, hydrobromic, hydroiodic, sulfamic, acetic, lactic, maleic, succinic, malic, fumaric, tartaric, citric, gluconic, glutaric, ascorbic, benzoic, cinnamic, isethionic and related acids.

The 2-phenylindoline amidines of the present invention characterized by Formula I are prepared by a process which comprises reacting a 2-phenylindoline having Formula II

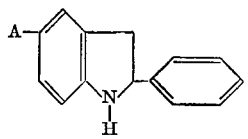

with a carboxamide selected from the group consisting of carboxamides of formulas

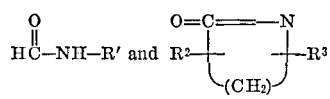

in the presence of phosphorus oxychloride in a suitable inert organic solvent. The symbols A in the 2-phenylindoline reactant and $R^1$, $R^2$, $R^3$ and $n$ in the carboxamide reactant have the meanings hereinabove described for Formula I. Suitable carboxamide reactants by way of example are: N-alkylformamides such as N-methylformamide, N-ethylformamide, N-n-propylformamide, N-isopropylformamide, N-n-butylformamide, N-tert.-butylformamide, and the like. In addition, cyclic carboxamides (lactams) can also be employed and include, for example, 2-pyrrolidinone, 5-methyl-2-pyrrolidinone, 5,5-dimethyl-2-pyrrolidinone, 3-methyl-2-pyrrolidinone, 4-methyl-2-pyrrolidinone, 5,5-di-n-butyl-2-pyrrolidinone, 2-oxohexamethyleneimine, 2-piperidone, 6-methyl-2-piperidone, 6,6-dimethyl-2-piperidone.

In carrying out the process for the preparation of the substances of Formula I, approximate stoichiometric quantities of substituted 2-phenylindoline and appropriate carboxamide reactants and phosphorus oxychloride are mixed together in an inert aprotic solvent. A suitable and preferred solvent for carrying out the process is 1,2-dichloroethane. Other suitable solvents such as chloroform, carbon tetrachloride, 1,1-dichloroethane, benzene, toluene, hexane, and the like may be satisfactorily employed. The mode of addition of the reactants is not critical in carrying out the process. For example, a solution or suspension of substituted 2-phenylindoline and a carboxamide in 1,2-dichloroethane can be added to a solution of phosphorus oxychloride or the sequence of addition may be reversed and a solution of phosphorus oxychloride in 1,2-dichloroethane can be added to a solution of the carboxamide and 2-phenylindoline. Alternatively, phosphorus oxychloride can be first added to the phenylindoline reactant and the carboxamide reactant then added. Another suitable adaptation of the process is the combination of phosphorus oxychloride with a carboxamide and the addition of this mixture to the indoline reactant. Combination of the reactants provides an exothermic reaction and external cooling can be employed to moderate the reaction. This is not necessary, however, for the successful completion of the reaction. The reaction of a carboxamide with the indoline reactant takes place in a facile manner when the reactants are combined and generally does not require prolonged heating for the formation of 2-phenyl amidine compounds of Formula I. We prefer, from a convenience standpoint, to carry out the reaction by the addition of phosphorus oxychloride in one portion to the mixture of the 2-phenylindoline reactant and carboxamide reactant in 1,2-dichloroethane at room temperature. Although the reaction may be carried out at a temperature of about $-35°$ C. to $100°$ C., we generally prefer to combine the reactants at room temperature with efficient stirring and then stir the reaction mixture overnight before isolating the product. Illustrative of the preferred method of the preparation of the compounds of Formula I is the addition of phosphorus oxychloride to a mixture of 2-phenylindoline and 5,5-dimethyl-2-pyrrolidinone in 1,2-dichloroethane at room temperature which provides after stirring for 16 hrs. 1-[2-(5,5-dimethyl-1-pyrrolinyl)]-2-phenylindoline.

With respect to the carboxamide reactants, many of them including 2-pyrrolidinone, 5-methyl-2-pyrrolidinone, 5,5-dimethyl-2-pyrrolidinone, 2-piperidone, 2 - oxohexamethyleneimine, are known compounds which are generally available from commercial sources or can be prepared in accordance with standard organic procedures known to those skilled in the art.

The indoline reactant identified by Formula II above are obtained by reduction of the appropriately substituted 2-phenylindoles which are prepared according to methods discussed in Elderfield, Heterocyclic Compounds, vol. 3, chapter 1 (1952, Wiley), particularly by the Bischler systhesis; refer to Elderfield, page 24, and C. Mentzer, D. Molho, and Y. Berguer, Bull. soc. chim., France, 555 (1950) [C.A., vol. 45, 4710b (1951)]. Preferably, the reduction is carried out with zinc dust and 85% phosphoric acid according to the method of L. J. Dolby and G. W. Gribble, J. Heterocyclic Chemistry, 3, 124 (1966). Thus, reduction of 2-phenylindoles such as . . .

2-phenylindole,
5-methyl-2-phenylindole,
5-ethyl-2-phenylindole,
5-n-butyl-2-phenylindole,
5-tert.-butyl-2-phenylindole,
5-methoxy-2-phenylindole,
5-ethoxy-2-phenylindole,
5-isopropoxy-2-phenylindole,
5-n-butoxy-2-phenylindole,
5-chloro2-phenylindole . . .

with zinc and 85% phosphoric acid provides the 2-phenylindolines . . .

2-phenylindoline,
5-methyl-2-phenylindoline,
5-ethyl-2-phenylindoline,
5-n-butyl-2-phenylindoline,
5-tert.-butyl-2-phenylindoline,
5-methoxy-2-phenylindoline,
5-ethoxy-2-phenylindoline,
5-isopropoxy-2-phenylindoline,
5-n-butoxy-2-phenylindoline,
5-chloro-2-phenylindoline.

It will be apparent to those skilled in the art that compounds of Formula I exist in at least one racemic stereoisomeric form inasmuch as they contain at least one asymmetric carbon atom; namely the phenyl substituted carbon of the indoline ring. In some instances, an additional asymmetric carbon atom is present in the B substituent and two racemic modifications exist. These mixtures can be separated into the individual racemic compounds on the basis of physico-chemical differences such as solubility.

The compounds of the present invention are evaluated as diuretics according to the method of W. L. Lipschitz et al., J. Pharmacol. Expt. Therap. 79, 97 (1943). In this method, groups of 8 rats are fasted 18 hours prior to the experiment. A control group is hydrated orally with 25 ml. per kilogram of body weight of isotonic saline solution which is also the vehicle used for dosing the test compound. One control group received a dose of 960 mg./kg. of body weight of urea. Animals of other groups are treated with various doses of the test compound. Immediately after treatment, the animals are placed in metabolism cages (two rats of the same group per cage) and maintained without food or water for 5 hours. The volume of urine excreted by each pair is determined after this period and the pooled urine is analyzed for sodium, potassium, and chloride ions. The results for the test compounds are expressed as ratios of the volume of urine or total quantites of electrolytes (i.e., sodium, potassium, and chloride) excreted during the experimental period compared to the saline and/or urea control group. The 2-phenylindolines of Formula I are orally administered in doses ranging from 2.7 to 25 mg./kg. of body weight.

In the Lipschitz test, the results obtained with the 2-phenylindoline amidines of the present invention clearly indicate that the amidines are orally effective diuretic agents. Substantially increased urine flow, sodium, and chloride ion excretion are obtained following the administration of the 2-phenylindoline amidines of Formula I. Exemplary of the diuretic activity obtained with the compounds of the present invention is that produced by administration of 2 - phenyl - 1-[7-(3,4,5,6-tetrahydro-2H-azepinyl)]indoline hydrochloride. At a dose of 24 milligram per kilogram of body weight, the volume of fluid excretion is 3.59 times that of saline control group and the sodium/potassium excretion ratio is 6.16 compared to 2.74 for the saline control. These sodium/potassium ratio values indicated that increased excretion of sodium ion compared to potassium ion is obtained with the test agent. Increased sodium ion excretion compared to retention of potassium ion is particularly useful in the field of diuretics, inasmuch as it is well known that a diuretic such as hydrochlorothiazide can produce excessive excretion of potassium ion causing an electrolyte imbalance with resulting adverse side effects.

Apart from diuretic action, the 2-phenylindoline amidines of the present invention effectively stimulate the central nervous system in mammals. Compounds which are central nervous system stimulants are generally referred to as being analeptic agents. One measure of analeptic activity is the ability of a substance to antagonize the depression of the central nervous system produced by administration of chloral hydrate to mice. This test is carried out by oral administering the 2-phenylindoline amidine test compound. This is followed immediately by an intraperitoneal dose of 300 milligram per kilogram of chloral hydrate. The average reduction in sleeping time is the measure of the central nervous system stimulant action of the test compound. Progressive doses of the test agent are employed until one is found that fails to alter significantly the recovery time. The recovery time is determined from the time of administration of the test compound to the spontaneous return of the righting reflex and is compared statistically with that of a control gruop. The results are summarized by indicating the effective dose that decreases the recovery time by 50% ($ED_{50}$). Representative $ED_{50}$ values for the compounds of the present invention range from about 2 to 40 milligrams per kilogram. Particularly preferred analeptic agents are 1 - [2 - (5 - methyl-1-pyrrolinyl)]-2-phenylindoline hydrochloride hemihydrate (Isomer A), and 2-phenyl - 1 - [2 - (1 - pyrrolinyl)]indoline hydrochloride which have $ED_{50}$ values of 2.4 and 5.8 milligrams per kilogram body weight respectively.

The 2-phenylindoline amidines of Formula I exert their optimum diuretic and analeptic effects dose ranging from about 0.1 to 100 milligram per kilogram of body weight per day. The substances of the invention may also be administered parenterally but the oral route is preferred as a matter of convenience and ease of administration. Oral administration of the compounds of Formula I to mice provide $ALD_{50}$ values in the range of 50 to 500 milligram per kilogram of body weight.

It is to be understood that the term "non-toxic effective dose" as used herein refers to the quantity of active ingredient necessary to produce the desired therapeutic effect without causing any harmful or deleterious side effects.

The 2-phenylindoline amidines of Formula I may be administered to mammals in the form of the free base or a non-toxic pharmaceutically acceptable acid addition salt. Pharmaceutical compositions of unit dosage form are obtained from the acid salts or the free bases by compounding or formulating them with organic or inorganic solid materials or liquids which are pharmaceutically acceptable carriers. Preferably, the unit dosage form comprises a pharmaceutical carrier and the 2-phenylindoline amidines in an amount sufficient to provide a dose ranging from about 0.1 to 100 milligram per kilogram of body weight of the mammal treated. An effective dose of the unit dosage form can be selected by those skilled in the art and administered to mammals to elicit diuresis and analeptic effects.

Pharmaceutical compositions considered within the scope of this invention may take the form of tablets, powder, granules, capsules, suspensions, solutions, and the like, including sustained release preparations. Suitable pharmaceutical carriers comprise both solids and liquids such as corn starch, lactose, calcium phosphate, stearic acid, polyethylene glycol, water, sesame seed oil, peanut oil, propylene glycol, and so forth.

The following examples illustrate the best mode contemplated for carrying out the present invention. They are merely illustrative and are not to be construed as limiting the scope of the claims in any manner whatsoever.

Example 1(a).—1 - [2 - (5 - methyl - 1 - pyrrolinyl)]-2 - phenylindoline: Phosphorus oxychloride (15.3 g., 0.1 mole) is added in one portion to a stirred mixture of 2-phenylindoline (19.5 g., 0.1 mole) and 5-methyl-2-pyrrolidinone (9.92 g., 0.1 mole) in 150 ml. of 1,2-dichloroethane. After stirring for 16 hrs., the reaction mixture is quenched in a mixture is quenched in a mixture of crushed ice and 100 ml. of 30% sodium hydroxide. The dichloroethane layer is separated and extracted with 100 ml. of 1.5 N hydrochloric acid and then with 100 ml. of water. The acid extract and water wash are combined and made basic with 40% sodium hydroxide. Extraction of the basified solution with ether, drying the ethereal extract over magnesium sulfate and concentrating provides 1-[2-(5-methyl-1-pyrrolinyl)]-2-phenyl-indoine base as a mixture of two racemic forms.

(b).—Racemate A: The mixture of racemic bases crystallized from 40 ml. of ethanol provides 20.4 g. (73% yield) of material with a melting point of 102-108° C. This material taken up in ethanol and the ethanolic solution acidified with ethanolic hydrogen chloride provides on cooling the single Racemate A, 1-[2-(5-methyl-1-pyrrolinyl)]-2-phenylindoline hydrochloride hemihydrate. The analytically pure Racemate A has a melting point of 220–221.5° C. (corr.).

Analysis.—Calcd. for $C_{19}H_{20}N_2 \cdot HCl \cdot \frac{1}{2}H_2O$ (percent): C, 70.90; H, 6.89; N, 8.70; Cl, 11.01. Found (percent): C, 70.65; H, 6.80; N, 8.64; Cl, 10.98.

(c).—Racemate B: The mother liquor remaining from the purification of Racemate A is concentrated in vacuo and the residual material dissolved in 50 ml. of water.

The aqueous solution is made basic with 40% sodium hydroxide and the basified solution extracted with ether. Concentration of the dried (magnesium sulfate) ethereal solution and crystallization of the residual free base from ethanol provides Racemate B free base with a melting point of 127–129° C. The free base is taken up in ethanol, treated with decolorizing charcoal and cooled in an ice bath. Additional crystallization from ethanol provides analytically pure Racemate B free base having a melting point of 137–139° C.

Analysis.—Calcd. for $C_{19}H_{20}N_2$ (percent): C, 82.57; H, 7.29; N, 10.14. Found (percent): C, 82.41; H, 7.14; N, 10.04.

The free base of Racemate B is taken up in ethanol and acidified with ethanolic hydrogen chloride. Ether is added to the ethanolic solution to provide analytically pure Racemate B. 1-[2-(5-methyl-1-pyrrolinyl)]-2-phenylindoline hydrochloride, M.P. 207.5–208.5° C. (corr.).

Analysis.—Calcd. for $C_{19}H_{20}N_2 \cdot HCl$ (percent): C, 72.95; H, 6.76; N, 8.96; Cl, 11.33. Found (percent): C, 72.98; H, 6.76; N, 8.91; Cl, 11.30.

Infrared and nuclear magnetic resonance spectra of 1-[2-(5-methyl-1-pyrrolinyl)] - 2 - phenylindoline hydrochloride hemihydrate (Racemate A) and 1-[2-(5-methyl-1-pyrrolinyl)] - 2 - phenylindoline hydrochloride (Racemate B) are consistent with respect to structure and indicate separate and pure racemates.

(d).—The 2-phenylindoline starting material for 1(a) above can be prepared from known materials as follows:

Phosphoric acid (200 ml. of 85%) is added to zinc dust (23.5 g., 0.36 mole) in a reaction vessel equipped with an efficient mechanical stirrer and a nitrogen atmosphere. The mixture is rapidly heated to about 90–100° C. and 2-phenylindole (23.2 g., 0.12 mole) added in portions over a 0.5 hr. period with vigorous stirring. After the addition is completed, the mixture is stirred for 6 hrs. at a temperature of about 110° C. and a second portion of zinc dust (7.8 g., 0.12 mole) is then added in one portion. Stirring is continued at a temperature of about 110° C. for 16 hrs. The reaction is cooled to 35° C. and 250 ml. of water added with stirring. This mixture is made basic with 40% sodium hydroxide and then extracted with ether. The ethereal extract is dried, concentrated, and the residual material distilled through a 6 cm. column at 0.1 mm. Hg to provide 7 g. (72%) of 2-phenylindoline, B.P. 120–125° C. which solidifies and has a melting point of 44–46° C.

Examples 2–8.—Representative 2-phenylindoline amidines prepared according to the hereinabove described procedures are enumerated in Table I. The indoline and carboxamide reactants are given along with analytical values and physical properties of the amidine products.

TABLE I.—2-PHENYLINDOLINE AMIDINES

| Ex. No. | 2-phenylindoline [a] amidine products | Reactants Indoline | Reactants Carboxamide | Base M.P., ° C. | HCl salt M.P., ° C. (corr.) |
|---|---|---|---|---|---|
| 2 | 1-(tert-butyliminomethyl)-2-phenylindoline hydrochloride. | 2-phenylindoline | N-tert.-butylformamide | 135–140/0.15 mm. Hg[b] | 239–240 |
| 3 | 2-phenyl-1-[2-(1-pyrrolinyl)]indoline hydrochloride. | do | 2-pyrrolidinone | 115–117 | 248–248.5 |
| 4 | 1-[2-(5,5-dimethyl-1-pyrrolinyl)]-2-phenylindoline hydrochloride. | do | 5,5-dimethyl-2-pyrrolidinone | 138–140 | 253–254.5 |
| 5 | 2-phenyl-1-(3,4,5,6-tetrahydro-2-pyridyl)indoline hydrochloride. | do | 2-piperidone | 131–133 | 199.5–200.5 |
| 6 | 2-phenyl-1-[7-(3,4,5,6-tetrahydro-2H-azepinyl)]indoline hydrochloride. | do | 2-oxohexamethyleneimine | 105–107 | 192.5–193.5 |
| 7 | 1-(tert-butyliminomethyl)-5-methyl-2-phenylindoline hydrochloride. | 5-methyl-2-phenylindoline[c] | N-tert.-butylformamide | 85–87 | 222.5–223.5 |
| 8 | 1-[2-(5,5-dimethyl-1-pyrrolinyl)]-5-methyl-2-phenylindoline hydrochloride. | do.[c] | 5,5-dimethyl-2-pyrrolidinone | 137–139 | 215–216.5 |

[a] See the following table:

| Example number | Analysis for— | Calcd. C | Calcd. H | Calcd. N | Calcd. Cl | Found C | Found H | Found N | Found Cl |
|---|---|---|---|---|---|---|---|---|---|
| 2 | $C_{19}H_{22}N_2 \cdot HCl$ | 72.48 | 7.36 | 8.90 | 11.26 | 72.76 | 7.26 | 8.76 | 11.12 |
| 3 | $C_{18}H_{18}N_2 \cdot HCl$ | 72.35 | 6.41 | 9.38 | 11.86 | 72.42 | 6.41 | 9.25 | 11.90 |
| 4 | $C_{20}H_{22}N_2 \cdot HCl$ | 73.49 | 7.09 | 8.57 | 10.85 | 73.24 | 6.98 | 8.45 | 10.59 |
| 5 | $C_{19}H_{20}N_2 \cdot HCl$ | 72.95 | 6.76 | 8.96 | 11.33 | 72.91 | 6.61 | 8.85 | 11.29 |
| 6 | $C_{20}H_{22}N_2 \cdot HCl$ | 73.49 | 7.09 | 8.57 | 10.85 | 73.58 | 7.09 | 8.56 | 10.98 |
| 7 | $C_{20}H_{24}N_2 \cdot HCl$ | 73.04 | 7.66 | 8.52 | 10.78 | 72.94 | 7.60 | 8.36 | 10.71 |
| 8 | $C_{21}H_{24}N_2 \cdot HCl$ | 73.99 | 7.39 | 8.22 | 10.40 | 73.70 | 7.25 | 8.08 | 10.40 |

[b] Boiling point.
[c] Prepared from 5-methyl-2-phenylindole according to the procedure of Example 1 (d), 5-methyl-2-phenylindoline has a boiling point of 126–128° C./0.12 mm. Hg and a melting point of 60–63° C Examples 9–30.—Additional exemplification of 2-phenylindoline amidines of the present invention are listed in Table II. They are prepared according to the procedure described in Eaxmple 1(a) by the reaction of the indicated 2-phenylindoline and carboxamide reactant employing phosphorus oxychloride.

TABLE II.—ADDITIONAL 2-PHENYLINDOLINE AMIDINES

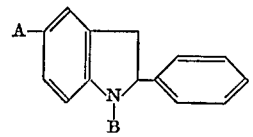

| Ex. No. | Product A | Product B | Reactants |
|---|---|---|---|
| 9 | H | —CH=N—CH₃ | 2-phenylindoline and N-methylformamide. |
| 10 | H | —CH=N—CH(CH₃)₂ | 2-phenylindoline and N-isopropylformamide. |
| 11 | H | (4-methylpyrrolin-2-yl) | 2-phenylindoline and 4-methyl-2-pyrrolidinone. |
| 12 | H | (3-methylpyrrolin-2-yl) | 2-phenylindoline and 3-methyl-2-pyrrolidinone. |
| 13 | H | (5,5-di-n-butylpyrrolin-2-yl) | 2-phenylindoline and 5,5-di-n-butyl-2-pyrrolidinone. |
| 14 | n-C₄H₉ | —CH=N—C(CH₃)₃ | 5-n-butylphenylindoline and N-tert.-butylformamide. |
| 15 | C₂H₅ | (5,5-dimethylpyrrolin-2-yl) | 5-ethyl-2-phenylindoline and 5,5-dimethyl-2-pyrrolidinone. |

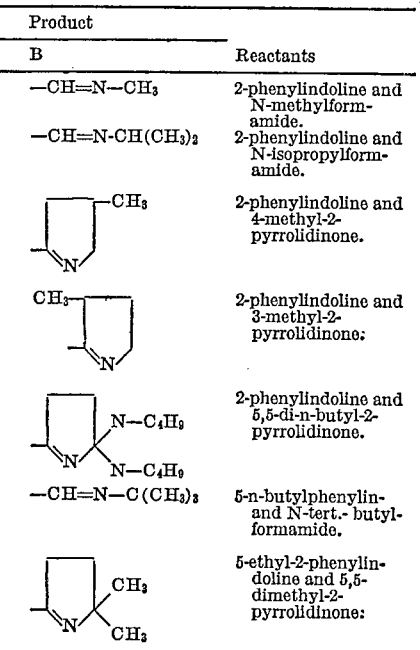

TABLE II—Continued

| Ex. No. | A | B | Reactants |
|---|---|---|---|
| 16 | n-C₄H₉ | 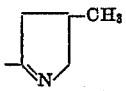 (pyrrolinyl with CH₃) | 5-n-butyl-2-phenylindoline and 4-methylpyrrolidinone. |
| 17 | (CH₃)₃C | 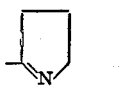 (pyrrolinyl) | 5-tert.-butyl-2-phenylinodoline and 2-pyrrolidinone. |
| 18 | CH₃O | —CH=N—C(CH₃)₃ | 5-methoxy-2-phenylindoline and N-tert.-butylformamide. |
| 19 | n-C₄H₉O | —CH=N—CH₃ | 5-n-butoxy-2-phenylindoline and N-methylformamide. |
| 20 | CH₃O | 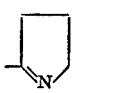 | 5-methoxy-2-phenylindoline and 2-pyrrolidinone. |
| 21 | C₂H₅O | 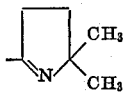 (with 2 CH₃) | 5-ethoxy-2-phenylindoline and 5,5-dimethylpyrrolidinone. |
| 22 | (CH₃)₂CHO | 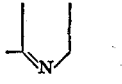 | 5-isopropoxy-2-phenylindoline and 2-pyrrolidinone. |
| 23 | n-C₄H₉O | 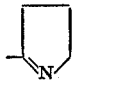 | 5-n-butoxy-2-phenylindoline 2-pyrrolidinone. |
| 24 | Cl | —CH=N—CH₃ | 5-chloro-2-phenylindoline and N-methylformamide. |
| 25 | Cl | —CH=N—(CH₃)₃ | 5 chloro-2-phenylindoline and N-tert.butylformamide. |
| 26 | Cl | 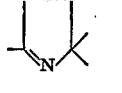 (with 2 CH₃) | 5-chloro-2-phenylindoline and 5,5-dimethyl-2-pyrrolidinone. |
| 27 | Br | 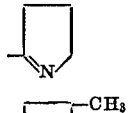 | 5-bromo-2-phenylindoline and 2-pyrrolidinone. |
| 28 | I | 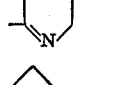 (with CH₃) | 5-iodo-2-phenylindoline and 4-methyl-2-pyrrolidinone. |
| 29 | H | 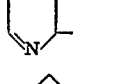 (piperidinone ring) | 2-phenylindoline and 6-methyl-2-piperidinone. |
| 30 | H | 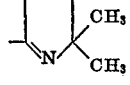 (with 2 CH₃) | 2-phenylindoline and 6,6-dimethyl-2-piperidinone. |

Example 31.—Pharmaceutical compositions: The 2-phenylindoline amidines characterized by Formula I are compounded with pharmacologically acceptable carriers to provide compositions useful in the present invention. Typical of the pharmaceutical compositions are the following:

(a).—Tablets: The amidines of Formula I are compounded into tablets according to the following example:

| Material: | Amount, g. |
|---|---|
| 2-phenyl-1-[7-(3,4,5,6-tetrahydro-2H-azepinyl)]indoline | 50.0 |
| Magnesium stearate | 1.3 |
| Corn starch | 12.4 |
| Corn starch pregelatinized | 1.3 |
| Lactose | 185.0 |

The foregoing materials are blended in a twin-shell blender and then granulated and pressed into tablets employing 250 mg. each. Each tablet contains 50 milligrams of active ingredient. The tablet may be scored in quarters so that a dose of 12.5 mg. of active ingredient may be conveniently obtained.

(b).—Capsules: The amidines of Formula I are compounded into capsules according to the following example.

| Materials: | Amount, mg. |
|---|---|
| Active ingredient | 125.0 |
| Lactose | 146.0 |
| Magnesium stearate | 4.0 |

The foregoing materials are blended in a twin-shell blender and then filled into No. 1 hard gelatin capsules. Each capsule contains 125 mg. of active ingredient.

While several specific embodiments are disclosed in the foregoing specification, it will be appreciated that other modifications may be made without departing from the spirit and scope of the appended claims.

What is claimed is:

1. A compound selected from the group consisting of 2-phenylindoline amidines having the formula

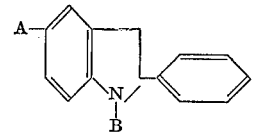

and non-toxic pharmaceutical acid addition salts thereof wherein
A is hydrogen, lower alkyl of 1 to 4 carbon atoms inclusive, lower alkoxy of 1 to 4 carbon atoms inclusive, or halogen,
B is

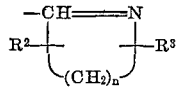

wherein
n is an integer of 3 to 5, and
R² and R³ are independently selected from the group consisting of hydrogen and lower alkyl of 1 to 4 carbon atoms inclusive.

2. A compound selected from the group consisting of 2-phenylindoline amidines having the formula

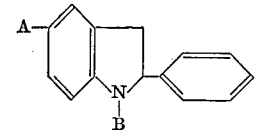

and non-toxic pharmaceutical acid addition salts thereof wherein
A is hydrogen, lower alkyl of 1 to 4 carbon atoms inclusive, lower alkoxy of 1 to 4 carbon atoms inclusive, or halogen,
B is —CH=N—R¹, wherein
R¹ is lower alkyl of 1 to 4 carbon atoms inclusive.

3. The compound of the group defined in claim 1 which is 2-phenyl-1-[2-(1-pyrrolinyl)]indoline.

4. The compound of the group defined in claim 1 which is 2-phenyl-1-[2-(1-pyrrolyinyl)]indoline hydrochloride.

5. The compound of the group defined in claim 1 which is 1-[2-(5-methyl-1-pyrrolinyl)]-2-phenylindoline.

6. The compound of the group defined in claim 1 which is 1-[2-(5-methyl-1-pyrrolinyl)]-2-phenylindoline hydrochloride hemihydrate.

7. The compound of the group defined in claim 1 which is 1-[2-(5,5-dimethyl-1-pyrrolinyl)]-2-phenylindoline.

8. The compound of the group defined in claim 1 which is 1-[2-(5,5-dimethyl-1-pyrrolinyl)]-2-phenylindoline hydrochloride.

9. The compound of the group defined in claim 1 which is 2-phenyl-1-(3,4,5,6-tetrahydro-2-pyridyl)indoline.

10. The compounds of the group defined in claim 1 which is 2-phenyl-1-(3,4,5,6-tetrahydro-2-pyridyl)indoline hydrochloride.

11. The compound of the group defined in claim 1 which is 2-phenyl-1-[7-(3,4,5,6-tetrahydro-2H-azepinyl)]indoline.

12. The compounds of the group defined in claim 1 which is 2-phenyl-1-[7-(3,4,5,6-tetrahydro-2H-azepinyl)]indoline.

13. The compound of the group defined in claim 1 which is 1-(tert.-butyliminomethyl)-2-phenyl-indoline.

14. The compound of the group defined in claim 1 which is 1-(tert.-butyliminomethyl)-2-phenyl-indoline hydrochloride.

References Cited

UNITED STATES PATENTS 3,472,872  10/1969  Bell _____ 260—326.15

ALEX MAZEL, Primary Examiner

I. A. NARCAVAGE, Assistant Examiner

U.S. Cl. X.R.

260—326.11; 424—263, 274